United States Patent

Wigsten et al.

[11] Patent Number: 5,993,342
[45] Date of Patent: Nov. 30, 1999

[54] HYDRAULIC TENSIONER WITH FORCE LIMITING TENSIONER SPRING

[75] Inventors: Mark Wigsten, Lansing; Roger Simpson, Ithaca; George L. Markley, Montour Falls, all of N.Y.

[73] Assignee: Borg-Warner Automotive, Inc., Troy, Mich.

[21] Appl. No.: 09/031,660

[22] Filed: Feb. 27, 1998

Related U.S. Application Data

[63] Continuation-in-part of application No. 08/823,717, Mar. 26, 1997, abandoned.

[51] Int. Cl.$^6$ .............................. F16H 7/08; F16H 7/22
[52] U.S. Cl. ............................... 474/110; 474/111
[58] Field of Search .................. 474/101, 109, 474/110, 111, 113, 117, 118, 133, 135, 136, 137, 138

[56] References Cited

U.S. PATENT DOCUMENTS

| | | | |
|---|---|---|---|
| 4,457,741 | 7/1984 | Hoeptner, III | 474/138 |
| 4,507,103 | 3/1985 | Mittermeier | 474/110 |
| 4,708,696 | 11/1987 | Kimura et al. | 474/103 |
| 4,713,043 | 12/1987 | Biedermann | 474/111 |
| 4,874,352 | 10/1989 | Suzuki | 474/110 |
| 4,881,927 | 11/1989 | Suzuki | 474/110 |
| 5,259,820 | 11/1993 | Mott | 474/110 |
| 5,277,664 | 1/1994 | Mott | 474/110 |
| 5,346,436 | 9/1994 | Hunter et al. | 474/110 |
| 5,577,970 | 11/1996 | Smith et al. | 474/110 |
| 5,700,213 | 12/1997 | Simpson et al. | 474/110 |
| 5,700,215 | 12/1997 | Tada et al. | 474/110 |
| 5,720,683 | 2/1998 | Patton | 474/109 |
| 5,879,256 | 3/1999 | Tada | 474/111 |

FOREIGN PATENT DOCUMENTS

| | | |
|---|---|---|
| 3623903 C1 | 12/1987 | Germany. |
| 4339610 A1 | 5/1995 | Germany. |

*Primary Examiner*—Thomas R. Hannon
*Assistant Examiner*—Matthew A. Kaness
*Attorney, Agent, or Firm*—Sidley & Austin; Greg Dziegielewski

[57] ABSTRACT

A hydraulic tensioner having a pre-loaded spring at the upper end of the piston to reduce the peak operating loads in a timing chain system. The spring member is located between the primary piston and an upper secondary piston.

15 Claims, 2 Drawing Sheets

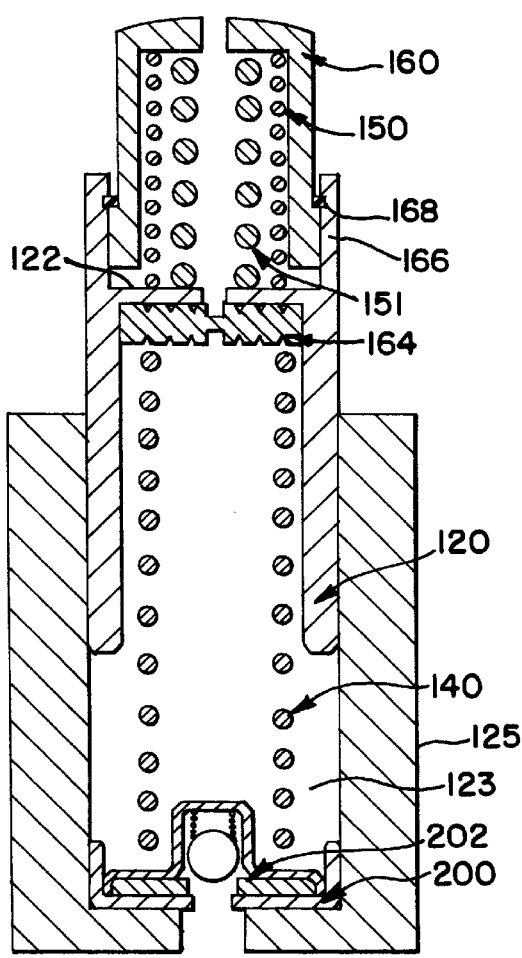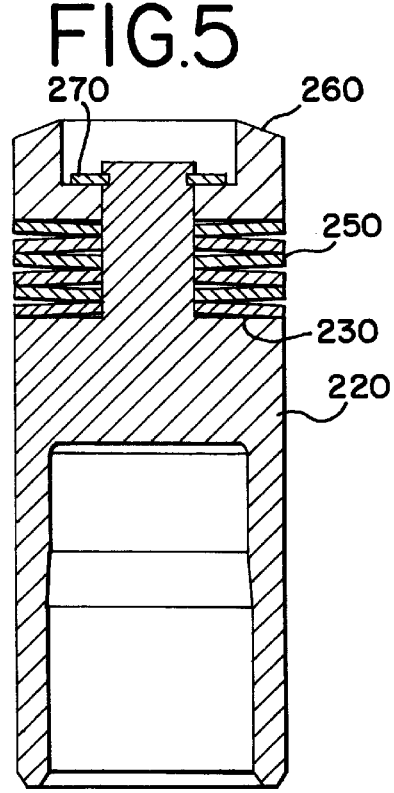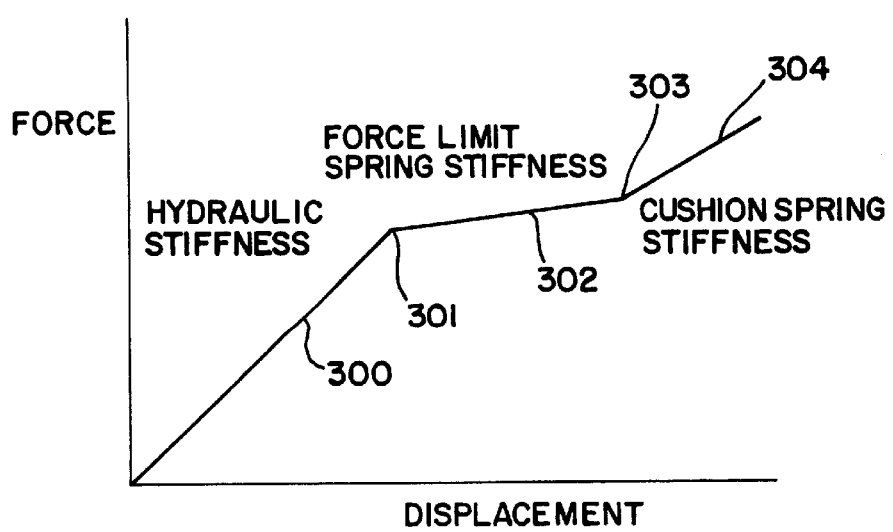

HYDRAULIC TENSIONER WITH FORCE LIMITING TENSIONER SPRING

This application is a continuation-in-part application of U.S. application Ser. No. 08/823,717, filed Mar. 26, 1997, now abandoned the subject matter of which is incorporated herein by reference.

Reference is made to U.S. application Ser. No. 08/421,366, filed Apr. 11, 1995, entitled "Hydraulic Tensioner with a Pressure Relief Valve," now issued U.S. Pat. No. 5,577,970, and U.S. application Ser. No. 08/516,919, filed Aug. 18, 1995, entitled "Integral Inlet and Pressure Relief Valve for an Automotive Tensioner," now issued U.S. Pat. No. 5,700,213, which are commonly owned and incorporated herein by reference. Reference is also made to U.S. application Ser. No. 08/730,615, filed Oct. 21, 1996, now issued U.S. Pat. No. 5,720,683.

BACKGROUND OF THE INVENTION

The present invention is directed to a hydraulic tensioner having a pre-loaded spring, or force limiting spring, contacting the upper end of the piston to reduce the peak operating loads in a timing chain system.

Hydraulic tensioners are typically used as a control device for a chain drive system in an automobile timing system. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. The tension in the chain may vary greatly due to the wide variation in the temperature and the linear thermal expansion among the various parts of the engine. Camshaft and crankshaft induced torsional vibrations cause chain tension to vary considerably. This tension variation results in chain elongation. Moreover, wear to the chain components during prolonged use can produce a decrease in the tension of the chain.

A hydraulic tensioner is used to take up the slack in the chain or belt that connects the camshafts to the crankshaft of the engine timing system. A typical hydraulic tensioner is comprised of a housing having a bore, a fluid chamber defined by the bore, and a hollow piston biased in a protruding direction from the bore by a spring. A check valve is also included in the hydraulic tensioner to permit fluid flow from a source of pressurized fluid into the fluid chamber, while preventing back flow in the reverse direction. The force of the chain against the piston in an inward direction is balanced by the resistance force of the fluid and force of the spring in an outward direction.

When the piston tends to move in the reverse direction, the check valve closes to restrict outflow of fluid from the chamber. Only a small clearance between the piston and the housing wall permits some fluid to escape, thereby allowing the piston to retract. In such a fashion, the tensioner achieves a so-called no-return function.

However, a potential problem with hydraulic tensioners is that the no-return function may present difficulties in accommodating tension spikes or surges in the chain. When a timing device operates at its resonant frequency, the chain load increases significantly. The small clearance between the piston and the housing wall is not sufficient to quickly release the hydraulic fluid in the chamber to accommodate the sudden overload of the chain.

One example of a tensioner that addresses this problem is described in Suzuki, U.S. Pat. No. 4,881,927. Suzuki discloses a hydraulic ball-type check valve tensioner having a piston slidably fitted into a chamber and biased by a spring in a protruding direction. This tensioner includes a relief valve having a sleeve slidably fitted in an auxiliary chamber in communication with the first chamber, with a spring biasing the sleeve into a depressed position to block a discharge part. Oil in the first chamber flows into the auxiliary chamber to force the sleeve against the biasing spring action to unblock the discharge port. Unfortunately, this relief valve may be slow to open and close due to high mass and subject to variable friction between the sleeve and auxiliary chamber wall. This may vary the pressure at which the relief valve operates.

Another example of a hydraulic tensioner that addresses the problem of overload is described in Mittermeier, U.S. Pat. No. 4,507,103. Mittermeier discloses a hydraulic tensioner having a piston slidably fitted into a chamber and biased by a spring in a protruding direction. This tensioner includes a relief valve in a bore at the protruding end of the piston. This relief valve is a spring-biased ball type valve with the spring set against a threaded throttle plug capping the bore. Oil in the first chamber forces the ball open, upon reaching a set high pressure, and flows into the bore past the throttle plug threads to the atmosphere. Unfortunately, this relief valve may be slow to release large displacements of oil because of the restricted path past the threads and resultant back-pressure build up against the ball.

Accordingly, it is an object of the present invention to provide a tensioner, which can maintain a substantially constant tensioning force. A pre-loaded spring device eliminates the need for an expensive pressure relief valve. A pre-loaded spring device also eliminates expensive wear face materials used in timing systems and especially in extraordinary strong timing chains used in systems with high resonance loads.

SUMMARY OF THE INVENTION

The present invention is directed to a hydraulic tensioner having a pre-loaded spring device. This device reduces the peak operating loads in a timing chain system. That is, the pre-loaded spring provides a mechanical force limiting system to permit inward movement of an auxiliary portion of the piston under peak force conditions.

In a first embodiment, the hydraulic tensioner includes a housing having a bore defining a fluid chamber and a hollow piston slidably received within the bore. The piston has a cylindrical aperture at its upper end. A nose piece having a cylindrical bottom fits into the cylindrical aperture of the piston with the upper end of the nose piece contacting a chain. The cylindrical bottom and the upper end of the piston are attached with a retaining pin through a slot. The retaining pin limits the movement of the nose piece. A first spring is located within the bore and biases the piston in a protruding direction from the bore. A second pre-loaded spring is located at the upper end of the piston around the cylindrical bottom of the nose piece.

A check valve is also provided between the chamber and a source of pressurized fluid to permit fluid flow from an oil supply inlet into the chamber, while blocking flow in the reverse direction. A passage in the housing connects the chamber with the source of pressurized fluid. Fluid is supplied by a reservoir and flows through the check valve into the pressurized chamber.

In a second embodiment of the present invention, the tensioner includes a chain guide arm, and the top of the nose piece fits into a slot at the bottom of the guide arm. There is also a cylindrical disc located between the nose piece and the piston, acting as a cushion or elastomeric bumper.

As the chain slackens and tightens, the piston protrudes or resists inward movement in response to the vibration of the chain. The outward force of the spring and fluid on the piston balances the inward force of the chain on the piston. The check valve blocks outflow of fluid when a load is applied to the piston by the chain in a direction opposite to the biasing direction, thereby increasing the fluid pressure in the chamber. At a predetermined reaction load, the nose piece moves against the pre-loaded spring to-disrupt the chain system resonance.

In another embodiment, a secondary piston, or force limiting piston, slides within the upper portion of the primary piston. A pair of springs are interposed between the primary piston and the upper end of the force limiting piston. One of these springs is a force limiting spring, while the second of these springs is a cushioning spring to limit the travel of the force limiting piston. At a predetermined reaction load, the force limiting spring compresses, which absorbs the reaction loads that exceed the predetermined maximum reaction load. As the limit of the force limit spring is approached, the resistance of the larger cushion spring dominates or operates to limit the travel of the force limit piston. In one embodiment, an elastomeric bumper is utilized that compresses when the force limiting spring and piston retract.

In yet another embodiment, a tensioner nose piece is held to the main piston by a retention clip. The pre-loaded spring is interposed between the piston and the nose piece. Screw threads may also be used in lieu of a retention clip. Alternatively, the end of the piston can be fixed or staked to the nose piece.

BRIEF DESCRIPTION OF THE DRAWINGS

FIG. 3 is a cross-sectional view of another embodiment of the tensioner of the present invention in which a pair of springs are interposed between a primary piston and a second, force limiting piston.

FIG. 4 is a schematic graphical representation of the expected effect of the force limiting spring and the cushion spring on the relationship between force and displacement in the embodiment of FIG. 3.

FIG. 5 is another embodiment of the present invention in which a retention clip holds the nose piece to the primary piston.

DETAILED DESCRIPTION OF THE PREFERRED EMBODIMENTS

Figure 1:
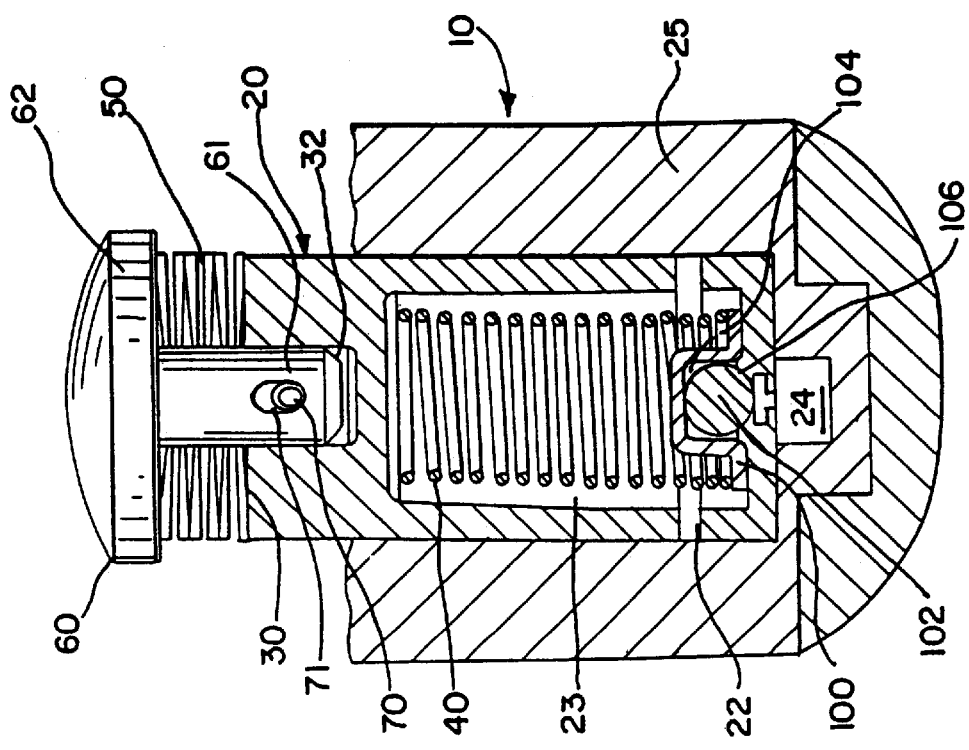
FIG. 1 is a cross-sectional view of a first embodiment of the hydraulic tensioner of the present invention.

FIG. 1 illustrates a first embodiment of hydraulic tensioner 10 incorporating a pre-loaded spring system. The tensioner 10 includes a housing 25 having a bore 23 in its center, which is filled with fluid through a passageway 24 from a pressurized fluid source (not shown). The fluid source may be an oil pump or a reservoir. The housing 25 receives a piston 20, having an upper end 30 with a cylindrical aperture 32, and a lower, hollow end that forms the fluid chamber 22 with the bore 23. A nose piece 60, having a cylindrical bottom 61 and wider elongated top 62, fits into the aperture 32 of the piston. The top 62 of the nose piece contacts a tensioner arm or chain to provide tension along a chain strand. The nose piece 60 is connected to the piston 20 with a retaining pin 70 that fits into a slot 71. The slot extends through the piston 20 and through the bottom 61 of the nose piece in order to allow connection of the piston to the nose piece by the pin 70. The slot 71 is larger than the retaining pin 70 so that the piston 20 can move axially with respect to the top 62 of the nose piece.

Figure 2:
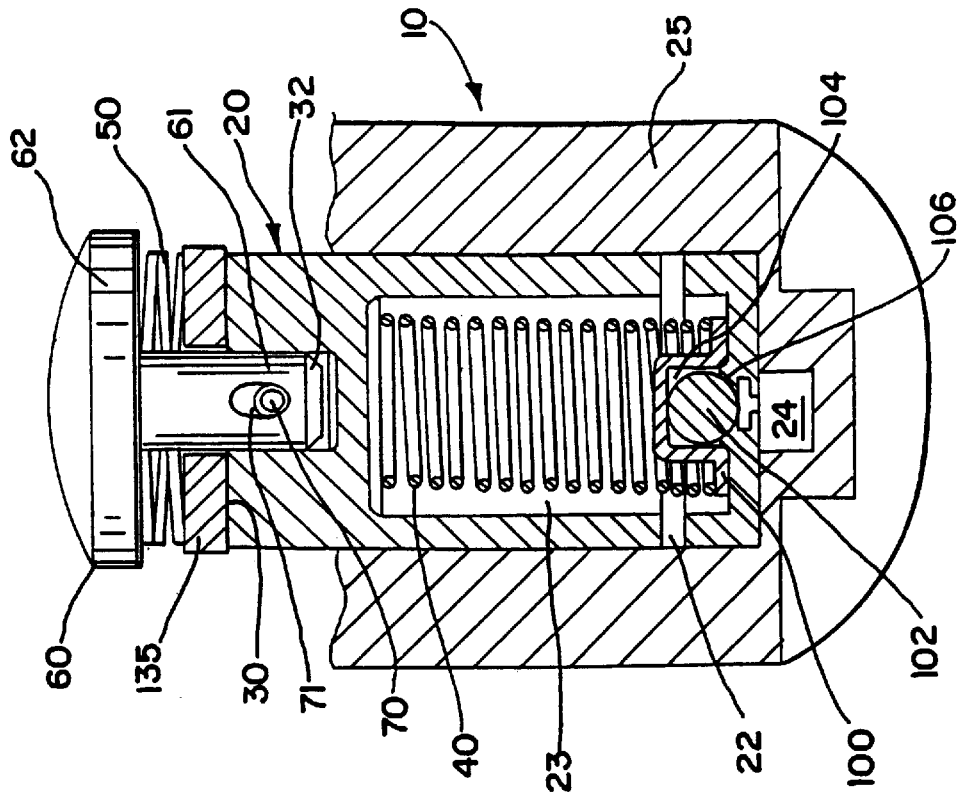
FIG. 2 is a cross-sectional view of the hydraulic tensioner of FIG. 1 with an alternative second spring assembly.

A first spring 40 contacts the piston 20 to bias the piston 20 in a protruding or outward direction. A second spring 50 is placed between the upper end 30 of the piston and the bottom of the flat portion 60 of the nose piece. The second spring 50 surrounds the cylindrical bottom 61 of the nose piece and biases the nose piece 60 in a protruding or outward direction. As shown in FIG. 2, a disc 135 may be provided between the second spring 50 and the upper end 30 of the piston. The spring 50 may be compression coil springs or stacked Belleville washers, or the like, which provide a known relationship between force and displacement. Disc 135 may be elastomeric acting as a cushion. Upward movement of the nose piece with respect to the piston 20 is restricted by the pin 70 in the slot 71.

A check valve 100 is provided between the chamber 22 and the passageway 24 as the source of fluid pressure to permit fluid flow into the chamber 22, while blocking fluid flow in the reverse direction. The check valve 100 includes a ball 102 and spring 104 within the check valve that biases the ball toward a ball seat 106. The check valve 100 may be a variable orifice check valve as shown and described in U.S. Pat. No. 5,259,820 and U.S. Pat. No. 5,277,664, both of which are owned by the assignee of the present application and both of which are incorporated herein by reference.

During start-up, fluid enters through passageway 24 and opens the check valve 100 such that fluid flows into chamber 22. As fluid fills the chamber 22, the piston 20 moves outward by the force of the pressurized fluid and the spring 40. The piston 20 continues to move outward until the inward force of the chain on the piston 20 balances the outward force of the spring 40 and the pressurized fluid in the chamber 22. At this point, the check valve 100 closes and prevents further fluid flow.

When a chain slackens due to wear or load fluctuations, the piston 20 moves outward again and the check valve 100 reopens to allow more fluid into the chamber 22. The piston 20 moves independently in conjunction with the force of the fluid and the spring 40.

The second spring 50, which is preloaded in compression between the piston 20 and nose piece 60, acts as a high force relief system. When the tension from the chain increases and forces the nose piece 60 downward against the piston 20, the fluid pressure in the fluid chamber 22 correspondingly increases. This increased pressure against the check valve 100 prevents fluid flow back through the valve 100. As the pressure in the fluid chamber 22 increases beyond a predetermined maximum value, the force against the second spring 50 will overcome the second spring 50 bias and force the second spring 50 to further compress. The nose piece 60 will move inward with respect to the piston 20 as the second spring 50 compresses. As the nose piece 60 moves inward, excess force beyond the maximum allowed will be accommodated by the system.

FIG. 3 illustrates another embodiment of the tensioner of the present invention. In this embodiment, a force limit piston 160 slides within the upper end of the primary piston 120. The primary piston includes a flat internal member 122 at its upper portion, which acts to retain a tortuous path vent 164. The primary piston 120 has an upwardly extending portion 166 that extends beyond the flat internal member 122. The outer edge of the force limit piston 160 slides within the inner edge of the upwardly extending portion 166. A retention clip 168 retains the force limit piston within the primary piston upwardly extending portion and provides an upper limit on travel of the force retention piston. The retention clip is preferably in the form of an expansible clip member concentrically mounted between the secondary piston and the primary piston.

The primary or main piston 120 is biased in an outward direction by primary or main spring 140. The main piston 120 forms fluid chamber 123 between the lower portion of the piston and the bore of the housing 125. Fluid is permitted to enter the fluid chamber 123 through check valve 202, which is sealed against the housing by check valve seal 200. Air may vent from the fluid in chamber 123 by passing through tortuous path vent 164. However, fluid does not fill the inside of the secondary piston 160.

The secondary or force limit piston 160 is biased outward from the lower or primary piston by a spring 150. Force limit spring 150 provides a resistance force against the inward movement of secondary piston 160. A second, cushion spring 151, with a higher stiffness rate than the force limit spring 150, is nested concentrically inside spring 150. A gap between spring 151 and piston 160 is provided so that spring 151 is not acted upon until the limit of the preload spring 150 has been exceeded. The two springs 150, 151 are shown as concentric coil springs. However, other combinations of resistance members, such as Belleville springs, are possible.

The cushion spring 151 is intended to provide a resistance to movement after the compression resistance limit of the force limit spring has been exceeded. However, in practice, the two springs may overlap in providing compressive resistance to inward movement of the force limit spring.

The embodiment of FIG. 3 operates in generally the same manner as the embodiments of FIGS. 1 and 2. The expected relationship between force and piston displacement is shown in the graph of FIG. 4. In the graph, the first portion 300 of the curve shows the displacement of the tensioner being resisted by the increasing force of the main piston spring and the hydraulic fluid within the main piston. It is understood that, after the spring has caused the piston to move outward and the chamber fills with hydraulic fluid, the combination of resistance force from the hydraulic fluid and compression spring 140 will resist displacement of the tensioner arm in a relationship that is generally linear and shown in the graph portion 300.

At some point, the main spring 140 and hydraulic fluid in chamber 123 will have met the pre-load force of the second spring, which is shown as point 301 on the graph of FIG. 4. In the second portion of the curve 302, the force limit spring 150 operates to provide a force limiting mechanism, or mechanism to permit further inward movement of the tensioner arm in response to increased load. In the second portion 302 of the curve, a load or force peak is absorbed by the force limit spring inside the force limit piston. This spring permits displacement of the force limit piston with respect to the main or primary piston to absorb the additional force requirements.

At a point 303 on the curve, the force limiting piston has moved into contact with the cushion spring. In portion 304, the cushion spring 151 provides additional resistance, which provides some additional cushion of the force limit piston.

In this embodiment, the force limit piston is providing a force relief function. In other words, once the predetermined resistance force of the hydraulic fluid in the main chamber and the resistance force of the main spring have been reached and exceeded, the force limit piston provides a further displacement, or force relief to limit the force on the chain system.

The cushion spring may be replaced by an elastomeric bumper or cushion. In this embodiment, the elastomeric bumper will be compressed when the force limiting spring and piston contract.

FIG. 5 illustrates another embodiment of the present invention. In this embodiment, the tensioner nose piece 260 is held to the main piston by a retention clip 270. A preloaded spring or set of springs 250 is placed between the nose piece 260 and an upper portion 230 of the main piston 220. The retention clip 270 holds the nose piece to the main piston and provides the force to preload the spring. Instead of a retention clip, the nose piece may be held to the piston by screw threads. Alternatively, the piston may be staked to capture the nose piece. This embodiment operates in a similar manner to the earlier embodiments.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore;

a primary piston slidably received within said bore, said primary piston having an opening at a lower end, said lower end opening defining a fluid chamber with said bore;

said primary piston having an opening at an upper end, said opening defining an upwardly extending upper member of said primary piston;

a secondary piston having a top portion and a base portion, said secondary piston being permitted to move axially with respect to said primary piston at said primary piston upper member, a restriction member limiting said axial movement of said secondary piston in an upward direction, said primary piston upper member limiting radial movement of said secondary piston base portion, a first spring member located within said bore, said first spring member biasing said primary piston in an upward protruding direction from said bore;

a second spring member located between said primary piston and said secondary piston, said second spring member biasing said secondary piston upward in an axial direction and away from said primary piston;

a check valve provided between the fluid chamber and a source of pressurized fluid to permit fluid flow from said fluid source into the chamber while blocking flow in the reverse direction; and a passage in the housing to connect the fluid chamber with the source of pressurized fluid.

2. The hydraulic tensioner of claim 1 wherein a third spring member is located between said secondary piston and said primary piston.

3. The hydraulic tensioner of claim 2 wherein said third spring member is an elastomeric pack.

4. The hydraulic tensioner of claim 2 wherein said second spring member and said third spring member are coil springs, said third spring member being nested within said second spring member.

5. The hydraulic tensioner of claim 4 wherein said second spring member is compressed a predetermined distance when interposed between said secondary piston and said primary piston, said second spring member being further compressed when the force against said secondary piston exceeds a predetermined amount.

6. The hydraulic tensioner of claim 5 wherein said third spring member is compressed during at least a portion of said further compression of said second spring member.

7. The hydraulic tensioner of claim 1 wherein said second spring member is comprised of a plurality of Belleville washers.

8. The hydraulic tensioner of claim 7 wherein a third spring member is an elastomeric part located between the Belleville washers and the secondary piston.

9. The hydraulic tensioner of claim 1 wherein said second spring member is a coil spring.

10. The hydraulic tensioner of claim 1 wherein said second spring member is compressed a predetermined distance when interposed between said secondary piston and said primary piston, said second spring member being further compressed when the force against said secondary piston exceeds a predetermined amount.

11. The hydraulic tensioner of claim 1 wherein said restriction member is an expansible clip concentrically mounted between said secondary piston and said primary piston.

12. The hydraulic tensioner of claim 1 wherein said secondary spring member is concentrically mounted about said primary piston upper member.

13. The hydraulic tensioner of claim 1 wherein said secondary piston includes a nose piece forming said top portion of said secondary piston, said secondary spring surrounding said cylindrical base portion.

14. The hydraulic tensioner of claim 13 wherein said cylindrical base portion includes an opening, said base portion being connected to said primary piston by a pin member extending through said base portion opening and said primary piston.

15. The hydraulic tensioner of claim 13 further comprising a disc member surrounding said cylindrical base portion, said disc member being located between said second spring member and said upper end of said primary piston.

* * * * *